United States Patent
Kakeshita et al.

(10) Patent No.: US 11,993,237 B2
(45) Date of Patent: *May 28, 2024

(54) DRIVE ASSISTANCE DEVICE

(71) Applicant: TOYOTA JIDOSHA KABUSHIKI KAISHA, Toyota (JP)

(72) Inventors: Mafune Kakeshita, Toyota (JP); Toshifumi Kawasaki, Toyota (JP); Kohei Morotomi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

This patent is subject to a terminal disclaimer.

(21) Appl. No.: 17/862,590

(22) Filed: Jul. 12, 2022

(65) Prior Publication Data
US 2022/0340106 A1 Oct. 27, 2022

Related U.S. Application Data

(63) Continuation of application No. 16/867,630, filed on May 6, 2020, now Pat. No. 11,433,861.

(30) Foreign Application Priority Data

Aug. 9, 2019 (JP) .................. 2019-146974

(51) Int. Cl.
*B60T 7/12* (2006.01)
*B60T 17/18* (2006.01)

(52) U.S. Cl.
CPC ............... *B60T 7/12* (2013.01); *B60T 17/18* (2013.01); *B60T 2201/10* (2013.01);
(Continued)

(58) Field of Classification Search
CPC ........ B60T 7/12; B60T 17/18; B60T 2201/10; B60T 2220/02; B60T 2220/06; B60T 2250/03
(Continued)

(56) References Cited

U.S. PATENT DOCUMENTS 5,969,602 A * 10/1999 Marks ................ B60Q 1/44
340/467
6,084,508 A * 7/2000 Mai .................... B60T 7/22
340/436
(Continued)

FOREIGN PATENT DOCUMENTS

CN 104369727 A 2/2015
CN 112292293 A * 1/2021 .............. B60T 1/065
(Continued)

OTHER PUBLICATIONS

U.S. Appl. No. 16/867,630, filed May 6, 2020.
Notice of Allowance dated Apr. 13, 2022 in U.S. Appl. No. 16/867,630.

*Primary Examiner* — Atul Trivedi
(74) *Attorney, Agent, or Firm* — Sughrue Mion, PLLC

(57) ABSTRACT

A drive assistance device includes an automatic brake unit configured to perform automatic brake control, a brake hold unit configured to perform a brake hold control keeping the vehicle stopped, a brake hold cancel unit configured to cancel the brake hold control when it is determined that a predetermined cancel condition is satisfied, a surroundings information obtaining unit configured to obtain surroundings information indicating a situation around the vehicle, a maneuver information obtaining unit configured to obtain maneuver information about a driving maneuver performed by a driver of the vehicle, a maneuver determination unit configured to determine, based on the surroundings information and the maneuver information whether the driving maneuver performed during the brake hold control is appropriate for the situation around the vehicle, and a prohibition unit configured to prohibit cancelling the brake hold control as long as it is determined that the driving maneuver is inappropriate.

8 Claims, 6 Drawing Sheets

(52) U.S. Cl.
CPC ....... *B60T 2220/02* (2013.01); *B60T 2220/06* (2013.01); *B60T 2250/03* (2013.01)

(58) Field of Classification Search
USPC .......................................................... 701/70
See application file for complete search history.

(56) References Cited

U.S. PATENT DOCUMENTS

| | | | |
|---|---|---|---|
| 9,108,629 B2 | 8/2015 | Otake | |
| 2002/0105423 A1* | 8/2002 | Rast | G08G 1/162 |
| | | | 340/467 |
| 2007/0035416 A1 | 2/2007 | Tanaka et al. | |
| 2011/0071001 A1 | 3/2011 | Yu et al. | |
| 2012/0191313 A1 | 7/2012 | Miyahara | |
| 2012/0239265 A1 | 9/2012 | Kato et al. | |
| 2014/0142797 A1 | 5/2014 | Otake | |
| 2014/0309903 A1 | 10/2014 | Otake | |
| 2014/0335994 A1 | 11/2014 | Otake | |
| 2015/0046054 A1 | 2/2015 | Takahashi et al. | |
| 2016/0144861 A1 | 5/2016 | Cao et al. | |
| 2016/0194000 A1 | 7/2016 | Taki et al. | |
| 2016/0207509 A1 | 7/2016 | Kida | |
| 2016/0214604 A1 | 7/2016 | Kida et al. | |
| 2017/0015203 A1* | 1/2017 | Oguri | B60L 50/62 |
| 2017/0113688 A1* | 4/2017 | Nakatsuka | B60W 30/181 |
| 2017/0291602 A1* | 10/2017 | Newman | B60W 10/18 |
| 2017/0369069 A1* | 12/2017 | Yen | B60W 40/09 |
| 2018/0170368 A1 | 6/2018 | Fukuman et al. | |
| 2018/0201239 A1* | 7/2018 | Nakagawa | G08G 1/16 |
| 2019/0004513 A1* | 1/2019 | Chiba | B60W 30/0956 |
| 2019/0039624 A1 | 2/2019 | Ike et al. | |
| 2019/0064804 A1* | 2/2019 | Frazzoli | B60W 60/0011 |
| 2019/0101932 A1 | 4/2019 | Zhang et al. | |
| 2019/0118820 A1 | 4/2019 | Akita et al. | |
| 2019/0225197 A1* | 7/2019 | Gomes | B60T 13/662 |
| 2019/0228118 A1* | 7/2019 | Hummelshøj | G06T 19/003 |
| 2019/0241188 A1* | 8/2019 | Tsuchiya | B60W 30/18163 |
| 2020/0312144 A1* | 10/2020 | Noguchi | G08G 1/143 |
| 2021/0039613 A1 | 2/2021 | Kakeshita | |
| 2021/0061278 A1* | 3/2021 | Zhao | B60W 40/06 |
| 2022/0212542 A1* | 7/2022 | Ortmann | B60T 8/321 |
| 2023/0055919 A1* | 2/2023 | Yoo | B60W 50/14 |
| 2023/0294731 A1* | 9/2023 | Kudo | B60W 30/18009 |
| | | | 701/23 |

FOREIGN PATENT DOCUMENTS

| | | | |
|---|---|---|---|
| DE | 102008042962 A1 | 4/2010 | |
| DE | 102008056204 A1 | 5/2010 | |
| DE | 102015215427 A1 * | 2/2017 | ............. B60T 13/66 |
| DE | 102017223360 A1 * | 7/2018 | ............. B60T 13/66 |
| DE | 102019108502 A1 * | 10/2020 | ............... B60T 7/14 |
| GB | 2498614 A * | 7/2013 | ............... B60T 7/12 |
| JP | 7-108850 A | 4/1995 | |
| JP | 2007112294 A | 5/2007 | |
| JP | 2012-153164 A | 8/2012 | |
| JP | 2012-179936 A | 9/2012 | |
| JP | 2013-133770 A | 7/2013 | |
| JP | 2013129228 A | 7/2013 | |
| JP | 2014-218158 A | 11/2014 | |
| JP | 2015-36270 A | 2/2015 | |
| JP | 2015-176372 A | 10/2015 | |
| JP | 2019-084984 A | 6/2019 | |
| JP | 2019-93882 A | 6/2019 | |
| WO | WO-2007023667 A1 * | 3/2007 | ........... B60T 13/662 |
| WO | WO-2007023668 A1 * | 3/2007 | ............... B60T 7/12 |
| WO | 2010045921 A1 | 4/2010 | |
| WO | 2011069489 A1 | 6/2011 | |
| WO | 2011074037 A1 | 6/2011 | |
| WO | 2013041600 A1 | 3/2013 | |
| WO | 2013072994 A1 | 5/2013 | |
| WO | 2013118256 A1 | 8/2013 | |
| WO | 2015/015259 A1 | 2/2015 | |
| WO | WO-2019064490 A1 * | 4/2019 | ............... B60T 7/12 |
| WO | WO-2019082947 A1 * | 5/2019 | ............. B60T 13/00 |
| WO | WO-2019107523 A1 * | 6/2019 | ........... B60T 13/662 |
| WO | WO-2019107524 A1 * | 6/2019 | ........... B41J 19/145 |
| WO | WO-2020090880 A1 * | 5/2020 | |
| WO | WO-2020162433 A1 * | 8/2020 | |
| WO | WO-2020178764 A1 * | 9/2020 | ............. B60Q 9/008 |
| WO | WO-2020241637 A1 * | 12/2020 | ........... B60T 13/147 |
| WO | 2021172500 A1 | 9/2021 | |

\* cited by examiner

DRIVE ASSISTANCE DEVICE

INCORPORATION BY REFERENCE

This application is a continuation application of U.S. application Ser. No. 16/867,630, filed on May 6, 2020, which claims priority under 35 USC § 119 to Japanese Patent Application No. 2019-146974 filed on Aug. 9, 2019 including the specification, drawings and abstract is incorporated herein by reference in its entirety.

BACKGROUND

1. Technical Field

The disclosure relates to drive assistance devices that stop a vehicle by automatic braking and keeps the vehicle stopped.

2. Description of Related Art

A technique that forces a vehicle to stop by automatic braking is known in the art. For example, a conventional collision avoidance assistance device applies automatic braking and stops a vehicle by increasing an oil pressure of hydraulic oil to be supplied to a brake device (brake oil pressure) when an object with which the vehicle is likely to collide is detected by a front sensor such as a camera sensor and a radar sensor. After stopping the vehicle by automatic braking, such an assistance device keeps the vehicle stopped by performing brake hold control, namely keeping the brake oil pressure high, for a predetermined time (e.g., 2 seconds).

An assistance device proposed by Japanese Unexamined Patent Application Publication No. 2019-84984 (JP 2019-84984 A) (hereinafter referred to as the related art device) cancels (terminates) brake hold control at the timing a maneuver performed by the driver (e.g., depression of an accelerator pedal, depression of a brake pedal, etc.) is detected, in the case where it is determined that it is desirable to keep the vehicle stopped for more than a predetermined time after the vehicle is stopped by automatic braking. For example, in a situation where the vehicle is stopped right in front of an intersection, in a situation where the vehicle is stopped as a vehicle traveling in a direction crossing the traveling direction of the vehicle has been detected, etc., it is determined that it is desirable to keep the vehicle stopped for more than the predetermined time. In this case, the brake hold control is cancelled at the timing a maneuver performed by the driver is detected.

SUMMARY

However, the related art device cancels the brake hold control merely when it detects a maneuver performed by the driver. Accordingly, the related art device may cancel the brake hold control when it detects the driver mistakenly depressing a wrong pedal. In this case, the vehicle will not be kept stopped even in a situation where the vehicle should be kept stopped.

In a situation where automatic braking has been applied, the driver may get upset and may not be able to perform an appropriate driving maneuver. For example, the driver may mistakenly step on the accelerator pedal even though he or she intends to step on the brake pedal. In this case, the brake hold control is cancelled due to the depression of the accelerator pedal, and the vehicle may accelerate suddenly according to the depression of the accelerator pedal.

Moreover, the related art device does not consider the situation around the vehicle when cancelling the brake hold control upon detection of a maneuver performed by the driver. Accordingly, when the brake hold control is cancelled due to the driver mistakenly depressing a wrong pedal, the vehicle may collide with an obstacle or the vehicle may start in violation of laws and regulations.

The disclosure provides a technique in which brake hold control is cancelled when it is estimated that a vehicle is safe even if brake hold control is cancelled.

An aspect of the disclosure relates to a drive assistance device. The drive assistance device includes: an automatic brake unit configured to perform automatic brake control when it is determined that a predetermined automatic stop condition is satisfied, the automatic brake control being control in which a braking force is applied to a vehicle to automatically stop the vehicle; a brake hold unit configured to perform brake hold control such that the vehicle stopped by the automatic brake unit moves neither forward nor rearward, the brake hold control being control in which the braking force is applied to the vehicle to keep the vehicle stopped; a brake hold cancel unit configured to cause the brake hold unit to cancel the brake hold control when it is determined that a predetermined cancel condition is satisfied during the brake hold control performed by the brake hold unit; a surroundings information obtaining unit configured to obtain surroundings information, the surrounding information being information indicating a situation around the vehicle; a maneuver information obtaining unit configured to obtain maneuver information, the maneuver information being information on a driving maneuver performed by a driver of the vehicle; a maneuver determination unit configured to determine, based on the obtained surroundings information and the obtained maneuver information, whether the driving maneuver performed during the brake hold control is appropriate for the situation around the vehicle; and a prohibition unit configured such that, even when the predetermined cancel condition is satisfied, the prohibition unit prohibits the brake hold cancel unit from causing the brake hold unit to cancel the brake hold control as long as the maneuver determination unit determines that the driving maneuver is inappropriate.

The drive assistance device of the above aspect includes the automatic brake unit, the brake hold unit, and the brake hold cancel unit. The automatic brake unit performs the automatic brake control, namely the control in which a braking force is applied to the vehicle to automatically stop the vehicle, when it is determined that the predetermined automatic stop condition is satisfied. For example, when an obstacle with which the vehicle is likely to collide is detected, the automatic brake unit operates a brake device (generate a braking force) to stop the vehicle without requiring the driver to depress a brake pedal.

The brake hold unit performs the brake hold control, namely the control in which the braking force is applied to the vehicle to keep the vehicle stopped, so that the vehicle stopped by the automatic brake unit moves neither forward nor rearward. The vehicle is thus kept stopped. The brake hold cancel unit cancels the brake hold control when it is determined that the predetermined cancel condition is satisfied during the brake hold control. Hereinafter, "cancel the brake hold control" is sometimes referred to as "cancel brake hold"

Brake hold should be cancelled when it is safe to do so. The disclosure therefore includes the surroundings information obtaining unit, the maneuver information obtaining unit, the maneuver determination unit, and the prohibition unit. The surroundings information obtaining unit obtains the surroundings information that is information indicating the situation around the vehicle. For example, the surroundings information obtaining unit obtains information on an obstacle that is present around the vehicle. Alternatively, the surroundings information obtaining unit may obtain information indicating the content indicated by a traffic infrastructure facility such as a traffic light located around the vehicle.

The maneuver determination unit obtains the maneuver information that is information on the driving maneuver performed by the driver of the vehicle. For example, the maneuver determination unit obtains information on a pedal maneuver performed by the driver (information on depression of an accelerator pedal and information on depression of the brake pedal).

The maneuver determination unit determines, based on the obtained surroundings information and the obtained maneuver information, whether the driving maneuver performed during the brake hold control is appropriate for the situation around the vehicle.

For example, the maneuver determination unit determines that such a driving maneuver that the vehicle may approach an obstacle if the brake hold control is cancelled or such a driving maneuver that the vehicle may make an illegal movement if the brake hold control is cancelled is inappropriate for the situation around the vehicle as a driving maneuver performed by the driver during the brake hold control.

Even when the cancel condition is satisfied, the prohibition unit prohibits the brake hold cancel unit from causing the brake hold unit to cancel the brake hold control as long as the maneuver determination unit determines that the driving maneuver is inappropriate.

According to the disclosure, the brake hold can be released only when it is safe to do so. Start of the vehicle which is not intended by the driver is thus less likely to occur, and the vehicle is less likely to collide with an obstacle when the brake hold control is cancelled.

In the drive assistance device of the above aspect, the brake hold cancel unit may be configured to determine that the predetermined cancel condition is satisfied when a brake hold time is equal to or longer than a predetermined cancel threshold time and the accelerator pedal is not being depressed, the brake hold time being a period during which the brake hold control is continuously performed.

When automatic braking is applied, a certain period of time is required before the driver becomes able to calmly judge a situation and maneuver the vehicle. The vehicle therefore should be kept stopped for a certain period of time. In the aspect of the disclosure, it is determined that the cancel condition is satisfied when the brake hold time, which is a period during which the brake hold control is continuously performed, is equal to or longer than the predetermined cancel threshold time and the accelerator pedal is not being depressed. In the case where it has been determined by the maneuver determination unit that the driving maneuver is appropriate for the situation around the vehicle when the brake hold time becomes equal to or longer than the predetermined cancel threshold time, the brake hold control is cancelled at this time. However, in the case where it has been determined by the maneuver determination unit that the driving maneuver is inappropriate for the situation around the vehicle when the brake hold time becomes equal to or longer than the predetermined cancel threshold time, the brake hold control is continued without being cancelled.

According to the above aspect, the brake hold is thus cancelled when it is safe to do so.

In the drive assistance device of the above aspect, the brake hold cancel unit may be configured to determine whether a specific maneuver, which is estimated to be a maneuver intended by the driver, has been performed during the brake hold control, and when the brake hold cancel unit determines that the specific maneuver has been performed, determine that the predetermined cancel condition is satisfied even when the brake hold time is less than the cancel threshold time.

There is a case where the driver intentionally performs a driving maneuver within a short time after the vehicle is stopped by the automatic braking. In this case, it is desirable to cancel the brake hold even before the stop hold time reaches the cancel threshold time. In the aspect of the disclosure, the brake hold cancel unit determines whether a specific maneuver, which is estimated to be a maneuver intended by the driver, has been performed during the brake hold control. When the brake hold cancel unit determines that the specific maneuver has been performed, the brake hold cancel unit determines that the cancel condition is satisfied even when the brake hold time is less than the cancel threshold time. In this case as well, in the case where it has been determined by the maneuver determination unit that the driving maneuver is appropriate for the situation around the vehicle when it is determined that the specific maneuver has been performed, the brake hold control is cancelled at this time. However, in the case where it has been determined by the maneuver determination unit that the driving maneuver is inappropriate for the situation around the vehicle when it is determined that the specific maneuver has been performed, the brake hold control is continued without being cancelled.

According to the aspect of the disclosure, the brake hold is cancelled at an appropriate timing. The driver can thus start the vehicle before the brake hold time reaches the cancel threshold time.

In the drive assistance device of the above aspect, the specific maneuver may be a maneuver of depressing the accelerator pedal again which is performed during the brake hold control.

That is, the specific maneuver may be a maneuver of releasing the driver's foot from the accelerator pedal, and then depressing the accelerator pedal again. This maneuver of depressing the accelerator pedal again can be estimated to be a driving maneuver intended by the driver. Accordingly, in the case where the maneuver of depressing the accelerator pedal again is detected, the brake hold is cancelled as long as this maneuver is appropriate for the situation around the vehicle.

In the drive assistance device of the above aspect, the specific maneuver may be depression of the brake pedal which is performed when a depression amount of the accelerator pedal is zero during the brake hold control. When the automatic brake control is performed, this depression of the brake pedal performed without depressing the accelerator pedal can be estimated to be a driving maneuver intended by the driver. This driving maneuver is appropriate for the situation around the vehicle because is it not a maneuver that starts the vehicle. Accordingly, the brake hold can be cancelled at the timing the depression of the brake pedal is detected.

In the drive assistance device of the above aspect, the maneuver determination unit may be configured to determine that the driving maneuver is inappropriate when, during the brake hold control, it is determined based on the obtained surroundings information that an obstacle with which the vehicle has a potential to collide is present and it is determined based on the obtained maneuver information that the accelerator pedal has been depressed.

In this case, since the brake hold will not be cancelled even if the driver mistakenly depresses the accelerator pedal. The vehicle is therefore less likely to collide with the obstacle.

In the drive assistance device of the above aspect, the maneuver determination unit may be configured to determine that the driving maneuver is inappropriate when, during the brake hold control, it is determined based on the obtained surroundings information that an obstacle with which the vehicle has a potential to collide is present and it is determined based on the obtained maneuver information that the brake pedal is not being depressed.

When the brake hold is cancelled with the brake pedal not being depressed, the vehicle starts due to creeping. In the aspect of the disclosure, when there is an obstacle with which the vehicle has the potential to collide, the brake hold will not be cancelled unless the brake pedal is depressed. Accordingly, the vehicle is less likely to collide with the obstacle due to creeping.

In the drive assistance device of the above aspect, the maneuver determination unit may be configured to determine that the driving maneuver is inappropriate when, during the brake hold control, it is determined based on the obtained surroundings information that a situation has occurred in which the vehicle is legally not allowed to start and it is determined based on the obtained maneuver information that the accelerator pedal has been depressed.

For example, the vehicle is not allowed to enter an intersection when the vehicle is kept stopped right in front of the intersection and when a traffic light at the intersection is red. In the aspect of the disclosure, the brake hold will not be cancelled even when the driver mistakenly depresses the accelerator pedal against his or her intension in a situation where the vehicle is legally not allowed to start. As a result, the driver can observe laws and regulations. Moreover, the vehicle is less likely to collide with other vehicle, a pedestrian, etc.

In the drive assistance device of the above aspect, the maneuver determination unit may be configured to determine that the driving maneuver is inappropriate when, during the brake hold control, it is determined based on the obtained surroundings information that a situation has occurred in which the vehicle is legally not allowed to start and it is determined based on the obtained maneuver information that the brake pedal is not being depressed.

In the aspect of the disclosure, in the case where the driver is not depressing the brake pedal and a situation has occurred in which the vehicle is legally not allowed to start, the brake hold will not be cancelled. The driver can observe the laws and regulations. Moreover, the vehicle is less likely to collide with other vehicle, a pedestrian, etc.

In the drive assistance device of the above aspect, the maneuver determination unit may be configured to determine whether the driver is seated in a seat of the driver during the brake hold control, and determine that the driving maneuver is inappropriate, when it is determined that the driver is not seated in the seat of the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A drive assistance device according to an embodiment of the disclosure will be described with reference to the accompanying drawings.

Figure 1:
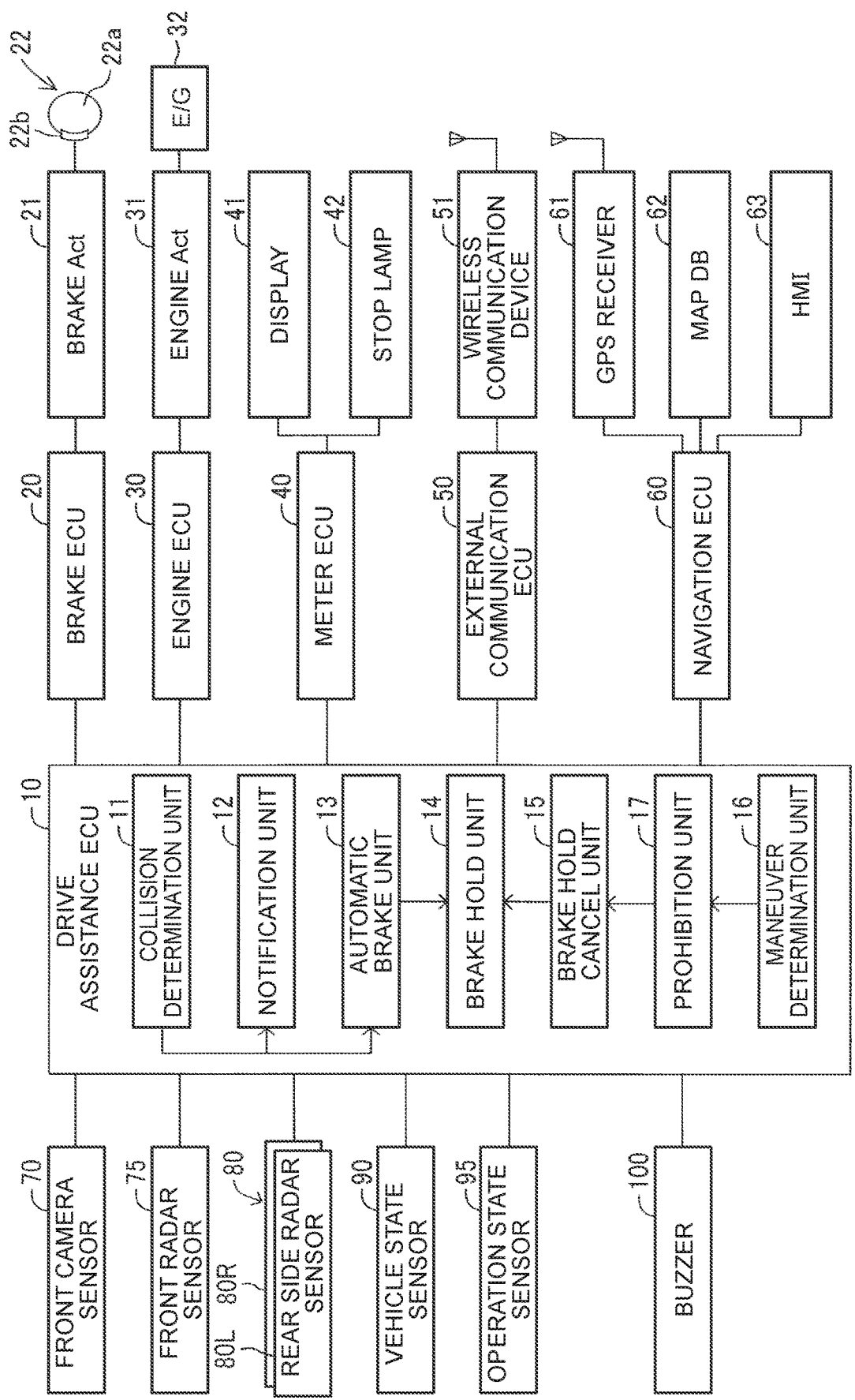
FIG. 1 is a schematic configuration diagram of a drive assistance device according to an embodiment of the disclosure.

The drive assistance device according to the embodiment of the disclosure is applied to a vehicle (hereinafter referred to as the "the vehicle" to distinguish it from other vehicles), and as shown in FIG. 1, includes a drive assistance ECU 10, a brake ECU 20, an engine ECU 30, a meter ECU 40, an external communication ECU 50, and a navigation ECU 60.

These ECUs are electric control units each having a microcomputer as a main part and are connected to each other via a Controller Area Network (CAN), not shown, so that they can send and receive information to and from each other. In this specification, the microcomputer includes a central processing unit (CPU), a read-only memory (ROM), a random access memory (RAM), a nonvolatile memory, an interface I/F, etc. The CPU carries out various functions by executing instructions (programs, routines) stored in the ROM. A part or all of these ECUs may be integrated into one ECU.

The drive assistance ECU 10 is a central control device that provides assistance to the driver in driving the vehicle. The drive assistance ECU 10 performs collision avoidance assistance control. The collision avoidance assistance control is control in which the driver is alerted when an obstacle is detected ahead of the vehicle, and a collision between the vehicle and the obstacle is avoided by automatic braking when the possibility of the collision is further increased. Since the collision avoidance assistance control is generally called pre-crash safety control (PCS control), the collision avoidance assistance control is hereinafter referred to as the PCS control.

The drive assistance ECU 10 is connected to a front camera sensor 70, a front radar sensor 75, a rear side radar sensor 80, a vehicle state sensor 90, an operation state sensor 95, and a buzzer 100.

The front camera sensor 70 is mounted on the upper part of a windshield in a passenger compartment and shoots the view ahead of the vehicle. The front camera sensor 70 percepts a white line on a road and a three-dimensional object that is present ahead of the vehicle, based on the image of the view, and supplies their information (white line information and three-dimensional object information) to the drive assistance ECU 10 at predetermined intervals. The white line information is information indicating the shape of the white line, the relative positional relationship between the vehicle and the white line, etc. The three-dimensional object information is information indicating the type of the three-dimensional object detected ahead of the vehicle, the size of the three-dimensional object, the relative positional relationship between the three-dimensional object and the vehicle, etc.

The front camera sensor 70 perceives the content represented by a traffic infrastructure facility, such as a traffic light and a road sign, which regulates driving of vehicles by laws and regulations. The front camera sensor 70 also supplies information indicating the content represented by the traffic infrastructure facility (hereinafter referred to as traffic infrastructure information) to the drive assistance ECU 10 at the predetermined intervals. Perception of the type of the three-dimensional object and the content represented by the traffic infrastructure facility is implemented by, e.g., machine learning.

The front radar sensor 75 is mounted in the center of the front of a vehicle body and detects a three-dimensional object that is present in an area ahead of the vehicle. The front radar sensor 75 emits radio waves in the millimeter band (hereinafter referred to as "millimeter waves") and receives millimeter waves reflected by a three-dimensional object (e.g., other vehicle, a pedestrian, a bicycle, a building, etc.) that is present within the emission range (that is, reflected waves). The front radar sensor 75 calculates the distance between the vehicle and the three-dimensional object, the relative speed between the vehicle and the three-dimensional object, the position (direction) of the three-dimensional object relative to the vehicle, etc. based on the phase difference between the emitted millimeter waves and the received reflected waves, the level of attenuation of the reflected waves, the time it takes from emission of the millimeter waves to reception of the reflected waves, etc. The front radar sensor 75 supplies information indicating the calculation results (three-dimensional object information) to the drive assistance ECU 10 at predetermined intervals.

The drive assistance ECU 10 combines the three-dimensional object information supplied from the front camera sensor 70 and the three-dimensional object information supplied from the front radar sensor 75 to obtain highly accurate three-dimensional object information.

Hereinafter, the front camera sensor 70 and the front radar sensor 75 are collectively referred to as the front sensor, and the information ahead of the vehicle, which is obtained from the front camera sensor 70 and the front radar sensor 75, is referred to as front sensor information.

The rear side radar sensor 80 includes a right rear radar sensor 80R and a left rear radar sensor 80L. The right rear radar sensor 80R is a radar sensor mounted on the right rear corner of the vehicle body, and the left rear radar sensor 80L is a radar sensor mounted on the left rear corner of the vehicle body. The right rear radar sensor 80R has its radar axis extending diagonally backward to the right and detects a three-dimensional object that is present in an area diagonally behind and to the right of the vehicle. The left rear radar sensor 80L has its radar axis extending diagonally backward to the left and detects a three-dimensional object that is present in an area diagonally behind and to the left of the vehicle. A method for detecting a three-dimensional object by the rear side radar sensor 80 is similar to that for detecting a three-dimensional object by the front radar sensor 75.

The rear side radar sensor 80 supplies three-dimensional object information, which is information on the detected three-dimensional object, to the drive assistance ECU 10 at predetermined intervals. Hereinafter, the information diagonally behind and to the right of the vehicle and diagonally behind and to the left of the vehicle, which is obtained from the rear side radar sensor 80, is referred to as rear sensor information. The information obtained using the front camera sensor 70, the front radar sensor 75, and the rear side radar sensor 80 is information indicating the situation around the vehicle and is sometimes referred to as surroundings information.

The vehicle state sensor 90 includes, e.g., a vehicle speed sensor, a longitudinal acceleration sensor, a lateral acceleration sensor, a yaw rate sensor, etc. The vehicle speed sensor detects the traveling speed of the vehicle, the longitudinal acceleration sensor detects the longitudinal acceleration of the vehicle, the lateral acceleration sensor detects the lateral acceleration of the vehicle, and the yaw rate sensor detects the yaw rate of the vehicle.

The operation state sensor 95 is a sensor or switch that detects a maneuver (driving maneuver) performed by the driver. The operation state sensor 95 includes an accelerator depression amount sensor, a brake depression amount sensor, a brake switch, a steering angle sensor, a steering torque sensor, a shift position sensor, etc. The accelerator depression amount sensor detects the depression amount of an accelerator pedal, the brake depression amount sensor detects the depression amount of a brake pedal, the brake switch detects whether the brake pedal is being depressed, the steering angle sensor detects a steering angle, the steering torque sensor detects steering torque, and the shift position sensor detects the shift position of a transmission. Information obtained using the operation state sensor 95 is information on a driving maneuver performed by the driver of the vehicle and is sometimes referred to as maneuver information.

The information detected by the vehicle state sensor 90 and the operation state sensor 95 (hereinafter referred to as sensor information) is supplied to the drive assistance ECU 10 at predetermined intervals via the CAN, not shown.

The buzzer 100 sounds according to an instruction from the drive assistance ECU 10. When alerting the driver, the drive assistance ECU 10 sends a sounding command to the buzzer 100 to sound the buzzer 100. The driver can thus be alerted.

The brake ECU 20 is connected to a brake actuator 21. The brake actuator 21 is provided in a hydraulic circuit between a master cylinder, not shown, that pressurizes hydraulic oil by the brake pedal force and friction brake mechanisms 22 provided on the right and left front and rear wheels. The friction brake mechanism 22 includes a brake disc 22a fixed to the wheel and a brake caliper 22b fixed to the vehicle body. The brake actuator 21 adjusts an oil pressure to be supplied to a wheel cylinder contained in the brake caliper 22b according to an instruction from the brake ECU 20. The brake actuator 21 operates the wheel cylinder by the oil pressure and thus presses a brake pad against the brake disc 22a to generate a friction braking force. The brake ECU 20 sets deceleration requested by the driver (driver requested deceleration) based on the depression amount of the brake pedal detected by the brake depression amount sensor, and controls operation of the brake actuator 21 so that the vehicle decelerates at the driver requested deceleration. When the brake ECU 20 receives a PCS brake command from the drive assistance ECU 10, the brake ECU 20 controls operation of the brake actuator 21 so that the vehicle decelerates at PCS requested deceleration. The PCS requested deceleration is information included in the PCS brake command.

The engine ECU 30 is connected to an engine actuator 31. The engine actuator 31 is an actuator that changes the operating state of an engine 32 (internal combustion engine), and includes, e.g., a throttle valve actuator that changes the opening amount of a throttle valve. The engine ECU 30 sets torque requested by the driver (driver requested torque) based on the depression amount of the accelerator pedal detected by the accelerator depression amount sensor and the vehicle speed detected by the vehicle speed sensor, and controls operation of the engine actuator 31 so that the engine 32 outputs the driver requested torque. When the engine ECU 30 receives an output limit command from the drive assistance ECU 10, the engine ECU 30 controls operation of the engine actuator 31 so as to limit output torque that is generated by the engine 32. In the case where the vehicle is an electric vehicle, the engine actuator 31 is a drive device for an electric motor. In the case where the vehicle is a hybrid vehicle, the engine actuator 31 is a drive device for the engine actuator and the electric motor.

The meter ECU 40 is connected to a display 41 and a stop lamp 42. The meter ECU 40 can display information related to drive assistance on the display 41 according to an instruction from the drive assistance ECU 10. The meter ECU 40 can turn on the stop lamp 42 according to an instruction from the drive assistance ECU 10 or the brake ECU 20.

The external communication ECU 50 is connected to a wireless communication device 51. The wireless communication device 51 is a device that receives traffic infrastructure information from a roadside unit installed on a road etc. The wireless communication device 51 supplies the received traffic infrastructure information to the external communication ECU 50. When the external communication ECU 50 receives a request to obtain traffic infrastructure information from the drive assistance ECU 10, the external communication ECU 50 supplies the traffic infrastructure information received by the wireless communication device 51 to the drive assistance ECU 10.

The traffic infrastructure information includes intersection information, road information, etc. The intersection information includes traffic light information on a traffic light at an intersection where a roadside unit is installed, vehicle detection information on a vehicle detected near an intersection (e.g., within a predetermined distance from the center of the intersection), pedestrian detection information on a pedestrian detected near an intersection, and intersection map information indicating the road shape of an intersection and the shape of each road connected to the intersection. The traffic light information includes information that can specify a period during which the traffic light is red (or green) according the intervals at which the traffic light cycles through green, yellow, and red, the times the traffic light turns green, yellow, and red, etc. The traffic infrastructure information is included in the surroundings information described above.

The navigation ECU 60 is connected to a GPS receiver 61, a map database 62, a human-machine interface 63 (hereinafter referred to as the HMI 63), etc. The GPS receiver 61 receives a GPS signal for detecting the current position location of the vehicle. The map database 62 stores map information etc. therein. The HMI 63 uses a touch panel display etc. The navigation ECU 60 specifies the current location of the vehicle based on the GPS signal, performs various calculations based on the location of the vehicle and the map information etc. stored in the map database 62, and provides route guidance using the HMI 63.

PCS Control

The PCS control in which automatic braking is applied will be described. Regarding the functions, the drive assistance ECU 10 includes a collision determination unit 11, a notification unit 12, an automatic brake unit 13, a brake hold unit 14, a brake hold cancel unit 15, an maneuver determination unit 16, and a prohibition unit 17.

The collision determination unit 11 determines whether the vehicle will collide with a three-dimensional object ahead of it based on the front sensor information supplied from the front sensor and the vehicle state detected by the vehicle state sensor 90. For example, the collision determination unit 11 determines whether the vehicle will collide with the three-dimensional object in the case where the three-dimensional object maintains its current moving state (its stopped state in the case where the three-dimensional object is a stationary object) and the vehicle maintains its current traveling state. When the collision determination unit 11 determines that the vehicle will collide with the three-dimensional object, it identifies the three-dimensional object as an obstacle based on the determination result.

Upon detection of the obstacle, the collision determination unit 11 calculates a predicted time to collision TTC. The predicted time to collision TTC is a predicted time until the vehicle collides with the obstacle. The predicted time to collision TTC is calculated by the following expression (1) based on the distance d between the obstacle and the vehicle and the speed Vr of the vehicle relative to the obstacle.

$$TTC = d/Vr \tag{1}$$

The predicted time to collision TTC is used as an index indicating the possibility that the vehicle collides with the obstacle. The smaller the value of the predicted time to collision TTC is, the more likely the vehicle is to collide with the obstacle (the higher the risk of collision is).

In the PCS control of the present embodiment, the possibility that the vehicle collides with the obstacle is divided into two levels based on the predicted time to collision TTC. At the initial level, namely the first level, the notification unit 12 warns the driver using the buzzer 100 and the display 41. At the second level at which the possibility that the vehicle collides with the obstacle is higher than at the first level, the automatic brake unit 13 performs brake control (automatic brake control) to provide collision avoidance assistance.

In this case, the collision determination unit 11 determines that the possibility that the vehicle collides with the obstacle has reached the first level when the predicted time to collision TTC decreases to a warning threshold TTCw or less. The collision determination unit 11 determines that the possibility that the vehicle collides with the obstacle has reached the second level when the predicted time to collision TTC further decreases to an operation threshold TTCa (<TTCw). In this example, the collision determination unit 11 determines that a predetermined automatic stop condition is satisfied when the possibility that the vehicle collides with the obstacle reaches the second level.

When it is determined that the possibility that the vehicle collides with the obstacle has reached the second level, the automatic brake unit 13 sends a PCS brake command to the brake ECU 20. The PCS brake command includes information indicating PCS requested deceleration Gpcs.

The PCS requested deceleration Gpcs can be calculated as follows. For example, in the case where the obstacle is stopped, the distance X to be traveled until the vehicle stops can be given by the following expression (2).

$$X = V \cdot t + (1/2) \cdot a \cdot t^2 \tag{2}$$

In the expression (2), V represents the current speed (relative speed) of the vehicle, a (<0) represents deceleration of the vehicle, and t represents the time until the vehicle stops. The time t until the vehicle stops can be given by the following expression (3).

$$t = -V/a \quad (3)$$

By substituting the expression (3) for the expression (2), the distance X to be traveled until the vehicle stops can be given by the following expression (4).

$$X = -V^2/2a \quad (4)$$

In order to stop the vehicle a distance β ahead of the obstacle, the deceleration a is calculated with the distance X being set to the distance d detected by the front sensor minus the distance β (the distance (d−β)). In the case where the obstacle is traveling, the deceleration a is calculated using the speed of the vehicle relative to the obstacle and the deceleration of the vehicle relative to the obstacle.

The deceleration a thus calculated is used as the PCS requested deceleration Gpcs. The PCS requested deceleration Gpcs has a set upper limit Gmax. When the calculated PCS requested deceleration Gpcs is higher than the upper limit Gmax, the PCS requested deceleration Gpcs is set to the upper limit Gmax.

When the brake ECU 20 receives the PCS brake command, it controls the brake actuator 21 to achieve the PCS requested deceleration Gpcs. A friction braking force is thus generated on the right and left front and rear wheels without requiring the driver to depress the brake pedal, so that the vehicle can be forced to stop. When the vehicle stops, the brake hold unit 14 instead of the automatic brake unit 13 controls the brake ECU 20. The automatic brake control is performed in this manner.

When the brake hold unit 14 confirms that the vehicle is stopped by automatic braking, it sends a brake hold command to the brake ECU 20 so that the vehicle is kept stopped (so that the vehicle moves neither forward nor rearward). In response to the brake hold command, the brake ECU 20 controls the brake actuator 21 to supply an oil pressure, which has been set to keep the vehicle stopped, to the wheel cylinders of the friction brake mechanisms 22 for the right and left front and rear wheels. The vehicle is thus kept stopped. Hereinafter, keeping the vehicle stopped is sometimes referred to as brake hold. Control for keeping the vehicle stopped is sometimes referred to as brake hold control.

The drive assistance ECU 10 sends an output limit command to the engine ECU 30 during automatic brake control and during brake hold control. The output limit command is a command to limit engine output torque (e.g., to reduce engine output torque to zero). The brake ECU 20 sends a command to turn on the stop lamp 42 to the meter ECU 40 during automatic brake control and during brake hold control.

The brake hold cancel unit 15 determines whether a preset cancel condition, which will be described later in detail, is satisfied. When the cancel condition is satisfied, the brake hold cancel unit 15 sends a brake hold cancel command to the brake ECU 20. The brake ECU 20 thus terminates the control of the brake actuator 21 which has been performed for brake hold. The brake hold of the vehicle is thus cancelled (that is, the brake hold control is cancelled), and the PCS control is terminated. The brake hold cancel unit 15 sends an output limit cancel command to the engine ECU 30. The vehicle is thus returned to its normal state, so that the vehicle can make acceleration and deceleration movements according to depression of the accelerator pedal and depression of the brake pedal.

Brake Hold Cancel Control

Brake hold (brake hold control) of the vehicle should be cancelled only when it is safe to do so. For example, a device is conventionally known which cancels brake hold (terminates brake hold control) when the vehicle is kept stopped (brake hold control is performed) for a predetermined time. With this conventional device, there is a case where brake hold is cancelled with an obstacle being present immediately ahead of the vehicle. In this case, the vehicle starts due to creeping unless the driver is stepping on the brake pedal at that time. As a result, the vehicle may collide with the obstacle or approach the obstacle too closely. Moreover, in the case where the driver gets upset by application of automatic braking and keeps stepping on the accelerator pedal although he or she should step on the brake pedal, brake hold may be cancelled, and the vehicle may accelerate suddenly.

There is also a device that continues brake hold control when it is determined that it is desirable to keep the vehicle stopped (i.e., continue brake hold control) even after a predetermined time passes from the time the vehicle is stopped by automatic brake control, and which cancels the brake hold (terminates the brake hold control) at the timing a driving maneuver performed by the driver is detected thereafter. With this device, however, brake hold may be cancelled based on a wrong driving maneuver by the driver such as the driver mistakenly stepping on a wrong pedal. In this case, brake hold is not continued even when it should be continued.

In the present embodiment, when the cancel condition is satisfied (that is, when cancelling brake hold), whether a driving maneuver performed by the driver during the brake hold control is appropriate for the situation around the vehicle based on information on the driving maneuver performed by the driver (maneuver information) and information indicating the situation around the vehicle (surroundings information).

This determination includes not only determination of whether the driving maneuver performed by the driver is appropriate for the situation around the vehicle but also determination of whether the driver is not performing a driving maneuver appropriate for the situation around the vehicle. That is, in the case where the driver is not performing a driving maneuver appropriate for the situation around the vehicle, it may be determined that the driving maneuver performed by the driver is inappropriate. Hereinafter, driving maneuvers performed by the driver are simply referred to as maneuvers performed by the driver.

Inappropriate maneuvers by the driver includes such a maneuver that the vehicle may approach an obstacle when brake hold is cancelled and such a maneuver that the vehicle may make an illegal movement when brake hold is cancelled.

The maneuver determination unit 16 determines based on surroundings information and maneuver information whether a maneuver performed by the driver while the vehicle is kept stopped by brake hold control is appropriate for the situation around the vehicle.

When the maneuver determination unit 16 determines that "the maneuver performed by the driver while the vehicle is kept stopped is inappropriate for the situation around the vehicle," the prohibition unit 17 prohibits the brake hold cancel unit 15 from causing the brake hold unit 14 to cancel the brake hold control.

Examples will be given in which the maneuver determination unit 16 determines that the maneuver performed by the driver is in appropriate for the situation around the vehicle. Conventional devices may cancel brake hold control in these examples.

The brake pedal is not being depressed in a situation where an obstacle has been detected immediately ahead of (right in front of) the vehicle.

The accelerator pedal is depressed in a situation where an obstacle has been detected ahead of the vehicle.

An obstacle has been detected in the estimated traveling direction of the vehicle when a steering wheel is maneuvered and the accelerator pedal is depressed.

The accelerator pedal is depressed when a moving object (other vehicle, a pedestrian, a bicycle, etc.) is predicted to cross in front of the vehicle.

The accelerator pedal is depressed when a moving object (other vehicle, a pedestrian, a bicycle, etc.) approaching the vehicle from diagonally behind is predicted to cut in.

The accelerator pedal is depressed when a traffic light ahead of the vehicle is red.

The accelerator pedal has been depressed since before application of automatic braking and is kept depressed without being released.

The brake hold cancel unit 15 determines that the cancel condition is satisfied when any of the following conditions is satisfied.

Cancel condition 1: The period which has elapsed since the vehicle was stopped by automatic brake control and during which brake hold control is continuously performed (hereinafter sometimes referred to as "hold time") is equal to or longer than a set time, and the accelerator pedal is not being depressed.

Cancel condition 2: A specific maneuver that can be estimated to be a maneuver intended by the driver was performed during a period in which brake hold control is continuously performed (during brake hold).

The specific maneuver in the cancel condition 2 is a maneuver of depressing the accelerator pedal again during brake hold and/or depressing the brake pedal during brake hole without depressing the accelerator pedal.

Depressing the brake pedal, depressing the accelerator pedal, and maneuvering the steering wheel are not regarded as maneuvers performed by the driver, in the case where substantial functions (decelerating function, accelerating function, and steering function) cannot be carried out by these maneuvers, such as in the case where such maneuvers are performed momentarily and in the case where their amounts of operation (the depression amount of the brake pedal, the depression amount of the accelerator pedal, and the operation amount of the steering wheel) are very small. Accordingly, in order for such maneuvers to be regarded as maneuvers performed by the driver, it is necessary that the maneuvers be continuously detected for a certain time or longer and their detected amounts of operation be a certain value or more.

Brake Hold Cancel Control Routine

Figure 2:
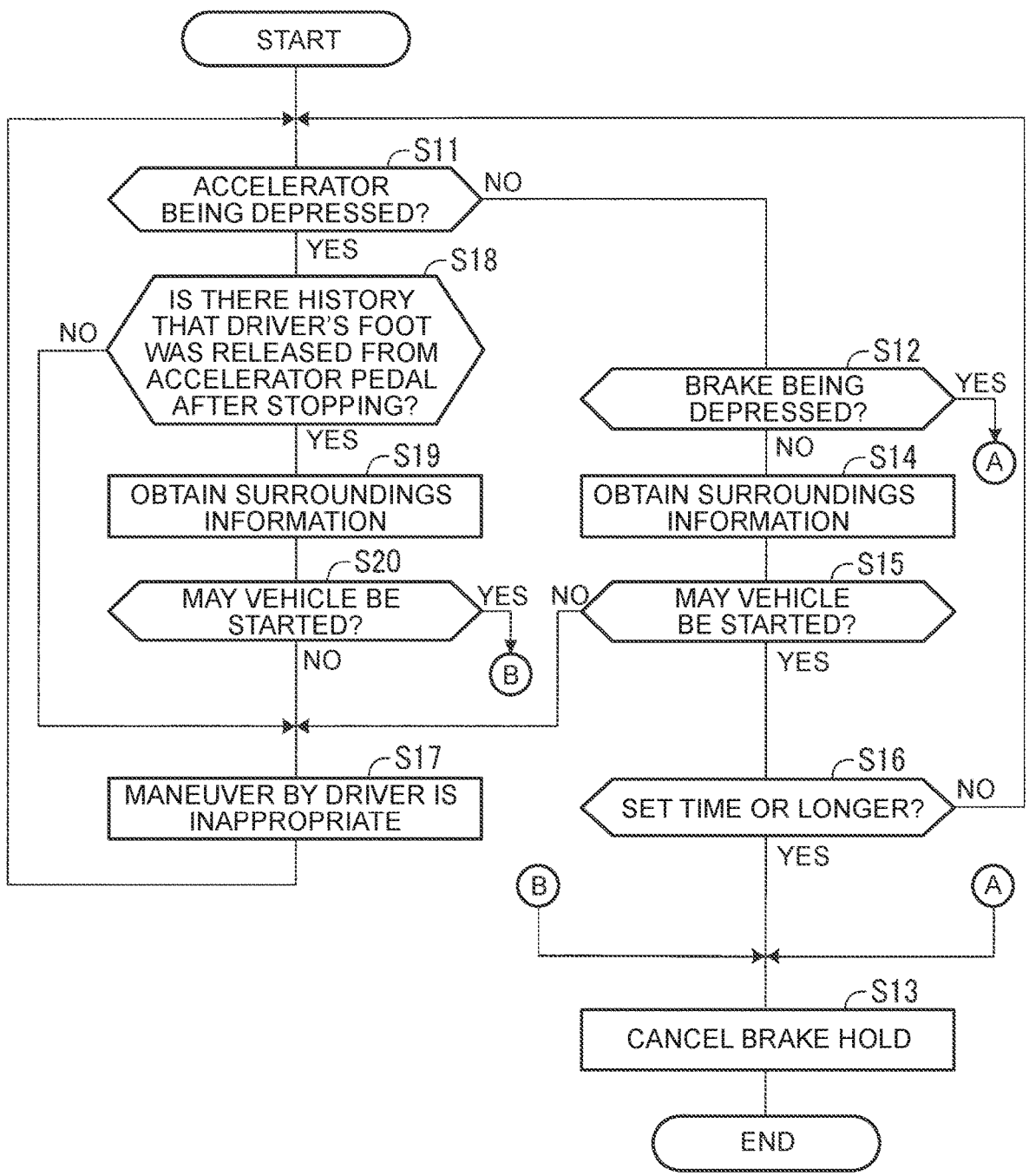
FIG. 2 is a flowchart illustrating a brake hold cancel control routine.

Next, a specific brake hold cancel control process that is performed by the drive assistance ECU 10 (functional units corresponding to the brake hold cancel unit 15, the maneuver determination unit 16, and the prohibition unit 17) will be described. FIG. 2 illustrates a brake hold cancel control routine that is executed by the drive assistance ECU 10. The drive assistance ECU 10 starts the brake hold cancel control routine when the vehicle is stopped by the PCS control (automatic brake control) and brake hold is started by brake hold control.

When the brake hold cancel control routine is started, the drive assistance ECU 10 determines in step S11 whether the accelerator pedal is being depressed. In this case, the drive assistance ECU 10 determines, based on the depression amount of the accelerator pedal detected by the accelerator depression amount sensor, whether the accelerator pedal is being depressed to such an extent that the accelerating function is being substantially carried out.

When depression of the accelerator pedal is not detected (S11: No), the routine proceeds to step S12. The drive assistance ECU 10 determines in step S12 whether the brake pedal is being depressed. In this case, the drive assistance ECU 10 determines, based on the depression amount of the brake pedal detected by the brake depression amount sensor, whether the brake pedal is being depressed to such an extent that the decelerating function is being substantially carried out.

The determination result in step S12 is "Yes" in the case where the driver is not stepping on the accelerator pedal but is stepping on the brake pedal. In this case, it can be estimated that the brake pedal is being depressed by the driver's intention. The vehicle will not start even when the brake hold control is cancelled (terminated) to cancel brake hold. Accordingly, in this case, the routine proceeds to step S13, in which the drive assistance ECU 10 cancels the brake hold control. More specifically, in step S13, the drive assistance ECU 10 sends a brake hold cancel command to the brake ECU 20 and sends an output limit cancel command to the engine ECU 30. The PCS control including the brake hold control is thus terminated, so that the vehicle can make acceleration and deceleration movements according to depression of the accelerator pedal and depression of the brake pedal by the driver.

After performing the process of step S13 (cancelling the brake hold control), the drive assistance ECU 10 terminates the brake hold cancel control routine. Once the drive assistance ECU 10 terminates the brake hold cancel control routine, it will not execute the brake hold cancel control routine until the vehicle is stopped by automatic brake control and brake hold is started by the brake hold control.

On the other hand, when depression of the brake pedal is not detected (S12: No), that is, when neither the accelerator pedal nor the brake pedal is being depressed, the routine proceeds to step S14. In step S14, the drive assistance ECU 10 obtains surroundings information such as front sensor information supplied from the front sensor and rear sensor information supplied from the rear side radar sensor 80. Subsequently, the drive assistance ECU 10 determines in step S15 whether the vehicle may be started (whether the safety of the vehicle is guaranteed) based on the surroundings information. As used herein, "start" means that the vehicle starts when the brake hold control is cancelled, namely the vehicle starts due to creeping.

For example, in the case where an obstacle is present right in front of the vehicle, the vehicle may start due to creeping and collides with the obstacle when the brake hold control is cancelled. Accordingly, the drive assistance ECU 10 determines that the brake vehicle should not be started (S15: No) in a situation where the vehicle is not separated from the obstacle (the distance between the vehicle and the obstacle is not secured) to such an extent that the driver can depress the brake pedal and stop the vehicle before the vehicle collides with the obstacle. The drive assistance ECU 10 may also determine that the brake vehicle should not be started when a traffic light ahead of the vehicle is red (that is, when the vehicle is not legally allowed to start).

When the drive assistance ECU 10 determines that the vehicle may be started (S15: Yes), the routine proceeds to step S16. The drive assistance ECU 10 determines in step S16 whether the time elapsed from the start of the current brake hold control (hold time) is equal to or longer than the set time (e.g., 2 seconds). For example, when the brake hold control is started, the drive assistance ECU 10 starts timing using a timer in synchronization with the start of the brake hold control and reads the timer value to make a determination in step S16. The set time corresponds to the "cancel threshold time."

When the hold time has not reached the set time (S16: No), the routine returns to step S11, and the drive assistance ECU 10 repeats the processing described above.

When the drive assistance ECU 10 determines after the hold time reaches the set time that neither the accelerator pedal nor the brake pedal is being depressed (S12: No) and that there is no problem in starting the vehicle due to creeping (S15: Yes), the routine proceeds to step S13. The brake hold control is thus cancelled.

When the accelerator pedal is not being depressed (S11: No) but depression of the brake pedal is detected (S12: Yes) before the hold time reaches the set time (S11: No), the brake hold control is cancelled as soon as depression of the brake pedal is detected, even before the hold time reaches the set time.

On the other hand, when the determination result in step S15 is "No," for example when an obstacle with which the vehicle may collide if it starts due to creeping, the routine proceeds to step S17. In step S17, the drive assistance ECU 10 determines a maneuver performed by the driver is inappropriate, and the routine returns to step S11.

Next, an example in which the accelerator pedal is being depressed will be described. When the drive assistance ECU 10 determines in step S11 that the accelerator pedal is being depressed (S11: Yes), the routine proceeds to step S18. The drive assistance ECU 10 determines in step S18 whether there is a history that the driver's foot was released from the accelerator pedal (i.e., the accelerator pedal was released) after the vehicle was stopped by automatic brake control (after the brake hold control was started).

When automatic braking is applied, the driver may get upset and may not be able to make a good judgement. Accordingly, there is a risk that the driver may mistakenly step on a wrong pedal, namely the driver may mistakenly continue to depress the accelerator pedal although he or she intends to step on the brake pedal. If the brake hold control is cancelled in this situation, the vehicle may start suddenly (accelerate suddenly) according to the depression of the accelerator pedal.

On the other hand, in the case where the driver depresses the accelerator pedal again during the brake hold control, namely in the case where the driver substantially releases his or her foot from the accelerator pedal, and then steps on the accelerator pedal again during the brake hold control, it can be estimated that the accelerator pedal is being depressed by the driver's intention to start the vehicle.

Accordingly, the process in step S18 is a process of determining whether the current depression of the accelerator pedal is an accelerator pedal maneuver that is not intended by the driver (S18: No) or an accelerator pedal maneuver that is performed by the driver's intention to start the vehicle (S18: Yes).

When the drive assistance ECU 10 determines that the accelerator pedal is being continuously depressed (S18: No), the routine proceeds to step S17. In step S17, the drive assistance ECU 10 determines that the maneuver performed by the driver is inappropriate, and the routine returns to step S11.

On the other hand, when the drive assistance ECU 10 determines that a maneuver of depressing the accelerator pedal again was performed (S18: Yes), the routine proceeds to step S19. In step S19, the drive assistance ECU 10 obtains surroundings information (front sensor information supplied from the front sensor and rear sensor information supplied from the rear side radar sensor 80). Subsequently, in step S20, the drive assistance ECU 10 determines whether the vehicle may be started based on the surroundings information. As used herein, "start" means that the vehicle starts when the brake hold control is cancelled, and the vehicle starts by depression of the accelerator pedal.

For example, the determination result in step S20 is "No" in any of the following situations.

1. An obstacle has been detected ahead of the vehicle (e.g., within a predetermined distance from the vehicle).
2. The steering wheel is being maneuvered and an obstacle has been detected in the estimated traveling direction of the vehicle.
3. A moving object (other vehicle, a pedestrian, a bicycle, etc.) is predicted to cross in front of the vehicle.
4. A moving object (other vehicle, a pedestrian, a bicycle, etc.) approaching the vehicle from diagonally behind is predicted to cut in.
5. A traffic light ahead of the vehicle is red.

When the determination result in step S20 is "No," the routine proceeds to step S17. In step S17, the drive assistance ECU 10 determines that the maneuver performed by the driver is inappropriate, and the routine returns step S11.

The drive assistance ECU 10 repeats such processing. Accordingly, the brake hold control will not be cancelled as long as it is determined that the maneuver performed by the driver is inappropriate.

When the determination result in step S20 is "Yes," the routine proceeds to step S13, and the drive assistance ECU 10 cancels the brake hold control. The PCS control is thus terminated.

Figure 3:
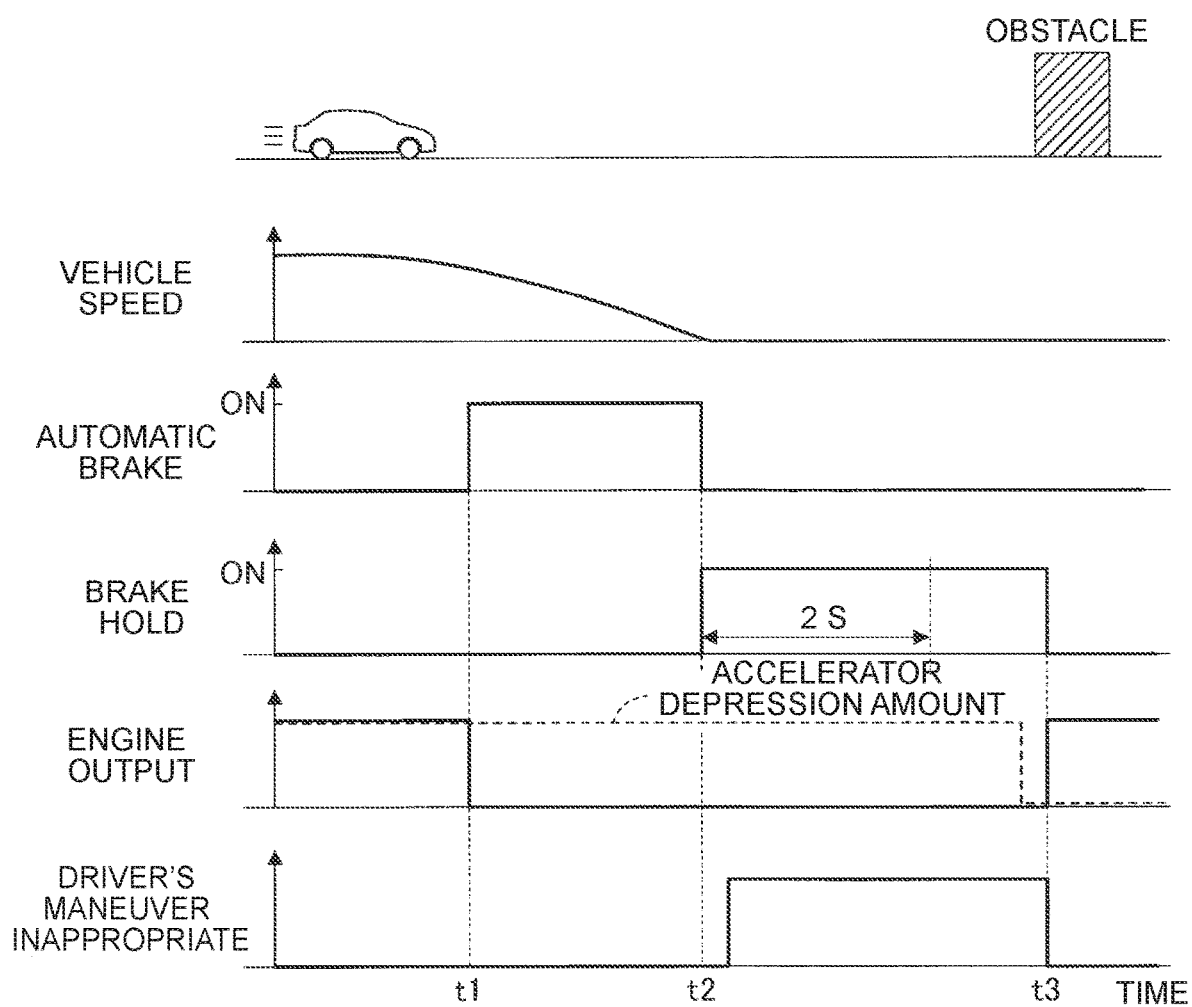
FIG. 3 is a timing chart according to the embodiment.

FIG. 3 is a timing chart illustrating an example of the timing at which brake hold is cancelled. Automatic brake control is started at time t1. At time t2, the vehicle is stopped, and brake hold control is started. In this example, the driver continues to depress the accelerator pedal even when the brake hold control is started. It is therefore determined after the brake hold control is started that the maneuver performed by the driver is inappropriate. Since the driver still keeps depressing the accelerator pedal even after the set time (e.g., 2 seconds) has passed since the start of the brake hold control, it is determined that this driving maneuver performed by the driver is inappropriate, and the brake hold control is continued.

At time t3, it is detected that the driver has finished depressing the accelerator pedal. The brake hold is cancelled at this time if there is no problem in starting the vehicle (S15: Yes).

Figure 4:
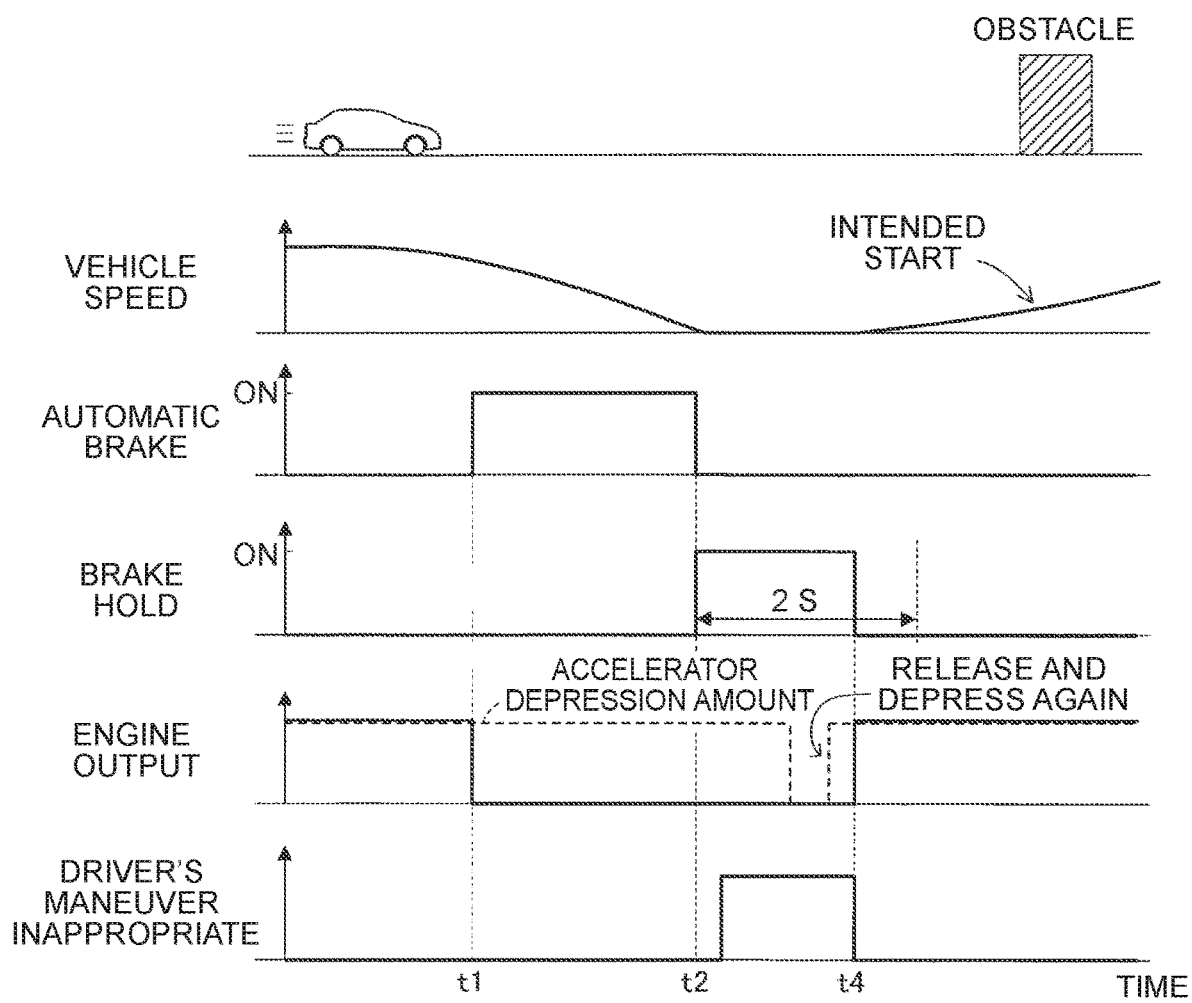
FIG. 4 is a timing chart according to the embodiment.

FIG. 4 illustrates an example in which the driver performed a maneuver of depressing the accelerator pedal again during the brake hold. The driver's maneuver of depressing the accelerator pedal again is detected at time t4. In this case, even before the hold time reaches the set time, the brake hold control is cancelled if there is no problem in starting the vehicle (S20: Yes). The vehicle therefore starts as intended by the driver.

Figure 5:
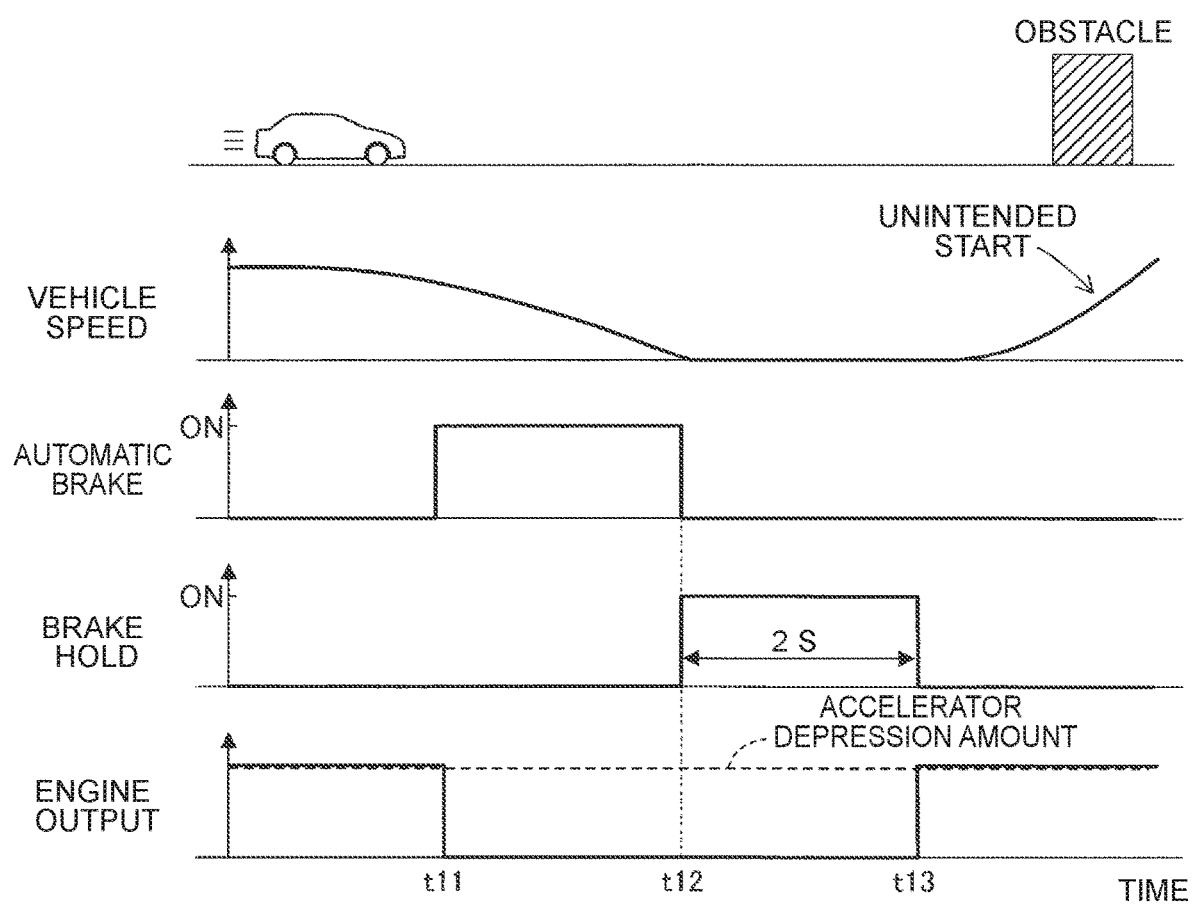
FIG. 5 is a timing chart according to a comparative example.

FIG. 5 is a timing chart illustrating an example of the timing at which brake hold control is cancelled in a conventional device as a comparative example. Automatic braking is started at time tn. At time t12, the vehicle is stopped, and brake hold control is started. In this example, the driver continues to depress the accelerator pedal even when the brake hold control is started. The brake hold control is cancelled at time t13, namely when a set time (e.g., 2 seconds) has passed since the start of the brake hold control.

At this time, since the accelerator pedal is still kept depressed, the vehicle starts suddenly when the brake hold control is cancelled.

As described above, according to the drive assistance device of the present embodiment, when cancelling the brake hold control, whether a driving maneuver performed by the driver when the vehicle is kept stopped is appropriate for the situation around the vehicle is determined based on information on the maneuver performed by the driver and information indicating the situation around the vehicle. When it is determined that the driving maneuver performed by the driver is inappropriate for the situation around the vehicle, the brake hold control is prohibited from being cancelled. On the other hand, when it is not determined at the timing that the cancel condition is satisfied that the driving maneuver performed by the driver is inappropriate for the situation around the vehicle, the brake stop control is cancelled. The brake hold (brake hold control) can be cancelled when it is safe to do so. Sudden start of the vehicle which is not intended by the driver is thus less likely to occur, and the vehicle is less likely to collide with an obstacle when the brake hold control is cancelled.

When it is determined that a driving maneuver that can be estimated to be a maneuver intended by the driver is performed during the brake hold control, the brake hold control is cancelled even before the hold time reaches the set time. In this case, the brake hold control is cancelled on the condition that it is not determined that a maneuver performed by the driver is inappropriate for the situation around the vehicle. The driver can thus start the vehicle based on his or her intention before the hold time reaches the set time.

For example, the maneuver of depressing the accelerator pedal again can be estimated to be a maneuver intended by the driver. Accordingly, in the case where the maneuver of depressing the accelerator pedal again is detected, the vehicle can be smoothly started when the situation around the vehicle is a situation where there is no problem in starting the vehicle.

In the case where the accelerator pedal is continuously depressed, it is determined regardless of the situation around the vehicle that the maneuver performed by the driver is inappropriate, and the brake hold control is prohibited from being cancelled. Sudden start of the vehicle which is not intended by the driver is thus less likely to occur.

Modifications

Figure 6:
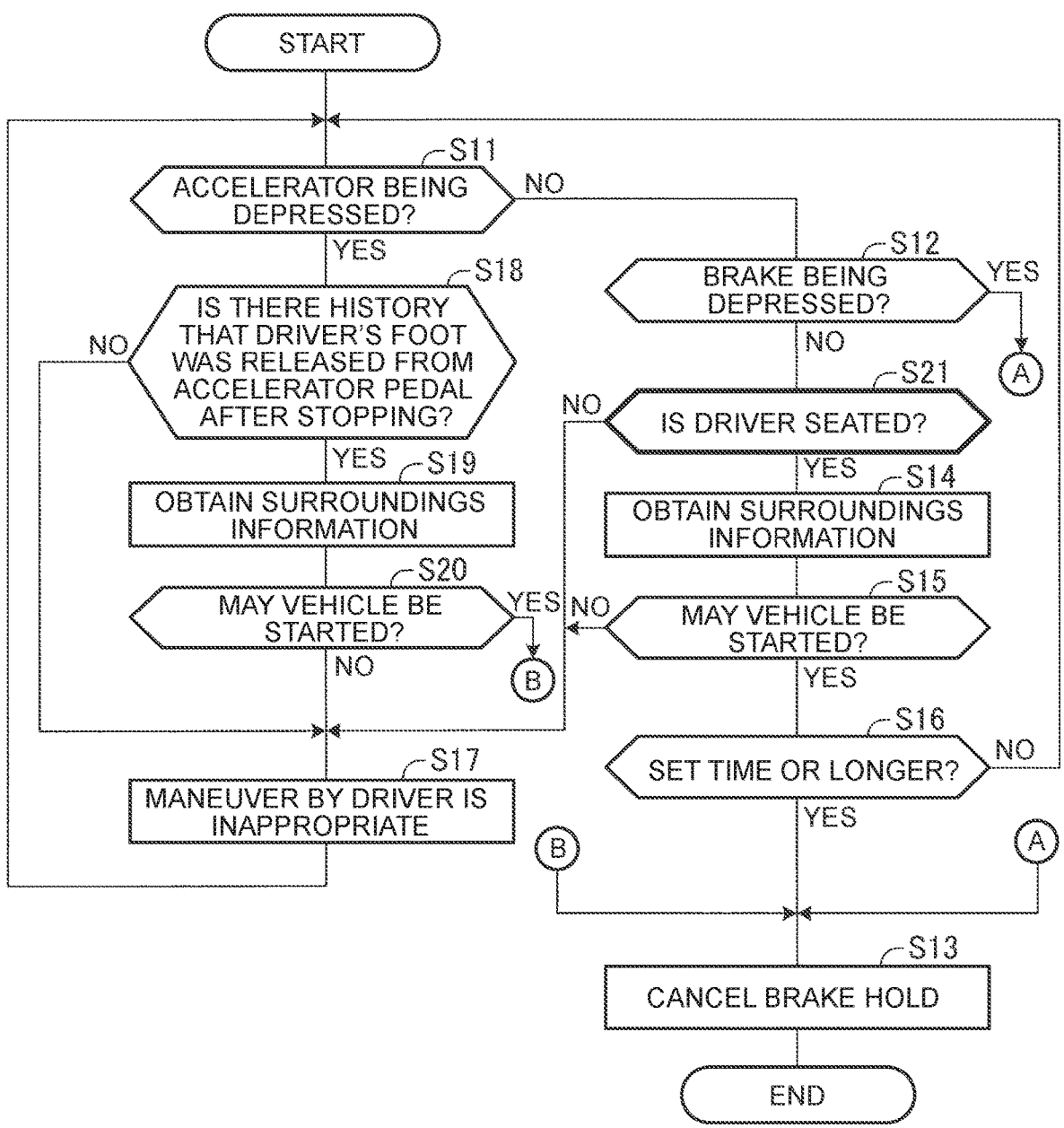
FIG. 6 is a flowchart illustrating a modification of the brake hold cancel control routine.

For example, as shown in FIG. 6, step S21 may be added between step S12 and step S14. Step S21 is a process of determining whether the driver is seated in a seat of the driver (whether the driver is outside the vehicle). For example, in step S21, the drive assistance ECU 10 reads a signal indicating the state of a seat belt switch (not shown) for the seat of the driver and determines whether the driver is seated in the seat of the driver. Alternatively, instead of the seat belt switch, the drive assistance ECU 10 may read a signal from other sensor, such as a seating sensor that detects the driver being seated in the seat of the driver, and may determine whether the driver is seated in the seat of the driver.

When the drive assistance ECU 10 determines that the driver is seated in the seat of the driver, the routine proceeds to step S14. When the drive assistance ECU 10 determines that the driver is not seated in the seat of the driver, the routine proceeds to step S17.

In the case where the driver is not seated in the seat of the driver, depression of neither the accelerator pedal nor the brake pedal will be detected. Accordingly, in the case where there is no obstacle ahead of the vehicle, the brake hold control is cancelled when the hold time becomes equal to the set time. According to the first modification, the brake hold control can be reliably prohibited from being cancelled even in such a case.

The drive assistance ECU 10 may determine whether any other switch provided for the seat of the driver has been operated in addition to the seat belt switch. In this case, the drive assistance ECU 10 may determine that the driver is seated in the seat of the driver when operation of the any other switch is detected.

Although the drive assistance device according to the embodiment is described above, the disclosure is not limited to the above embodiment, and various modifications can be made without departing from the object of the disclosure.

For example, in the above embodiment, the brake hold cancel control is applied to automatic braking that is applied by the PCS control. However, the automatic braking to which the brake hold cancel control is applied is not limited to the PCS control. For example, the automatic braking to which the brake hold cancel control is applied may be applied to a drive assistance system that applies automatic braking when it is estimated based on traffic infrastructure information obtained by the front sensor (information indicated by a traffic light and a road sign) that the driver will fail to stop the vehicle at a predetermined stop position (e.g., the driver failed to see a traffic light) although he or she should stop the vehicle by laws and regulations. The traffic infrastructure information need not necessarily be obtained from the front camera sensor 70. For example, traffic infrastructure information that is sent wirelessly from a roadside unit etc. may be obtained via the wireless communication device 51.

The automatic braking to which the brake hold cancel control is applied may also be applied to a false start suppression system that makes the vehicle less likely to start suddenly against the driver's intention by applying automatic braking upon detection of the driver mistakenly stepping on a wrong pedal (a driver's maneuver of mistakenly stepping on the accelerator pedal although he or she intends to step on the brake pedal).

The front sensor may be modified as appropriate. For example, the front camera sensor 70 may not have a function to perceive traffic infrastructure facilities such as traffic lights.

In the above embodiment, traffic infrastructure information (e.g., a traffic light: red) is included as one of the conditions for determination in step S20. However, such traffic infrastructure information need not necessarily be included in the conditions for determination in step S20. The drive assistance ECU 10 may only determine in step S20 whether there is an obstacle.

In the above embodiment, when keeping the vehicle stopped, the brake actuator 21 is controlled to supply an oil pressure, which has been set to keep the vehicle stopped, to the wheel cylinders of the friction brake mechanisms 22 for the right and left front and rear wheels. However, an electric parking brake (not shown) may be operated to keep the vehicle stopped.

What is claimed is:
1. A drive assistance device comprising:
an automatic brake unit configured to perform automatic brake control of a vehicle to automatically stop the vehicle;
a brake hold unit configured to perform brake hold control of the vehicle to keep the vehicle stopped after the automatic brake control is performed;

an exterior vehicle sensor configured to surroundings information of the vehicle;
an operation state sensor configured to detect at least one driving maneuver performed by a driver of the vehicle;
a brake hold cancel unit configured to cancel the brake hold control of the vehicle when a cancel condition is satisfied;
a prohibition unit configured to prohibit cancelation of the brake hold control, even when the cancel condition is satisfied, based upon a predetermined situation of the vehicle being satisfied,
wherein the predetermined situation includes: (i) a situation around the vehicle indicates that a predetermined surroundings information is satisfied and (ii) a predetermined driving maneuver is performed by the driver.

2. A drive assistance device according to claim 1, wherein when (i) the predetermined surroundings information indicates that a traffic light ahead of the vehicle is red and (ii) the predetermined driving maneuver being performed by the driver does not include depression of a brake pedal, the predetermined situation is satisfied.

3. A drive assistance device according to claim 1, wherein when (i) the predetermined surroundings information indicates that an obstacle is a predetermined distance ahead of the vehicle and (ii) the predetermined driving maneuver being performed by the driver does not include depression of a brake pedal, the predetermined situation is satisfied.

4. A drive assistance device according to claim 1, wherein when (i) the predetermined surroundings information indicates that a traffic light ahead of the vehicle is red and (ii) the predetermined driving maneuver being performed by the driver includes depressing of an accelerator pedal, the predetermined situation is satisfied.

5. A drive assistance device according to claim 1, wherein when (i) the predetermined surroundings information indicates that an obstacle is a predetermined distance ahead of the vehicle and (ii) the predetermined driving maneuver being performed by the driver includes depressing of an accelerator pedal, the predetermined situation is satisfied.

6. A drive assistance device according to claim 1, wherein when (i) the predetermined surroundings information indicate that a moving object is predicted to cross in front of the vehicle and (ii) the predetermined driving maneuver being performed by the driver includes depressing of an accelerator pedal, the predetermined situation is satisfied.

7. A non-transitory storage medium in which a program is recorded, when the program is executed by a processor of a drive assistance device, the program causes the processor of the drive assistance device to execute:
performing automatic brake control of a vehicle to automatically stop the vehicle;
performing brake hold control of the vehicle to keep the vehicle stopped after the automatic brake control is performed;
obtaining surroundings information of the vehicle from an exterior sensor;
detecting, using an operation state sensor, at least one driving maneuver performed by a driver of the vehicle;
canceling the brake hold control of the vehicle when a cancel condition is satisfied; and
prohibiting canceling of the brake hold control, even when the cancel condition is satisfied, based upon a predetermined situation of the vehicle being satisfied,
wherein the predetermined situation includes: (i) a situation around the vehicle indicates that a predetermined surroundings information is satisfied and (ii) a predetermined driving maneuver is performed by the driver.

8. A drive assistance method comprising:
performing automatic brake control of a vehicle to automatically stop the vehicle;
performing brake hold control of the vehicle to keep the vehicle stopped after the automatic brake control is performed;
obtaining surroundings information of the vehicle from an exterior sensor;
detecting, using an operation state sensor, at least one driving maneuver performed by a driver of the vehicle;
canceling the brake hold control of the vehicle when a cancel condition is satisfied; and
prohibiting canceling of the brake hold control, even when the cancel condition is satisfied, based upon a predetermined situation of the vehicle being satisfied,
wherein the predetermined situation includes: (i) a situation around the vehicle indicates that a predetermined surroundings information is satisfied and (ii) a predetermined driving maneuver is performed by the driver.

\* \* \* \* \*